US008667178B2

(12) United States Patent
Kumagai (10) Patent No.: US 8,667,178 B2
(45) Date of Patent: Mar. 4, 2014

(54) TRANSMITTING APPARATUS FOR TRANSMITTING DATA AND TRANSCEIVING SYSTEM FOR TRANSMITTING AND RECEIVING DATA

(75) Inventor: Atsushi Kumagai, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 2368 days.

(21) Appl. No.: 11/013,532

(22) Filed: Dec. 17, 2004

(65) Prior Publication Data
US 2005/0141858 A1 Jun. 30, 2005

(30) Foreign Application Priority Data

Dec. 25, 2003 (JP) ................................. 2003-430882

(51) Int. Cl.
*G06F 15/16* (2006.01)
*H04L 29/06* (2006.01)
*H04N 21/2662* (2011.01)
*H04L 29/08* (2006.01)
*H04L 12/70* (2013.01)

(52) U.S. Cl.
CPC ..... *H04L 29/06476* (2013.01); *H04L 29/08792* (2013.01); *H04L 2012/5664* (2013.01); *H04L 65/4092* (2013.01); *H04L 65/602* (2013.01); *H04N 21/2662* (2013.01)
USPC ........................................................ 709/246

(58) Field of Classification Search
CPC ................................................ H04N 21/2662
USPC ................... 709/203, 231–233, 246; 382/232
See application file for complete search history.

(56) References Cited

U.S. PATENT DOCUMENTS

| 5,918,002 | A | * | 6/1999 | Klemets et al. | 714/18 |
| 5,956,088 | A | | 9/1999 | Shen et al. | |
| 5,961,599 | A | * | 10/1999 | Kalavade et al. | 709/224 |
| 6,014,694 | A | * | 1/2000 | Aharoni et al. | 709/219 |
| 6,041,354 | A | * | 3/2000 | Biliris et al. | 709/226 |
| 7,003,794 | B2 | * | 2/2006 | Arye | 725/100 |
| 7,191,246 | B2 | * | 3/2007 | Deshpande | 709/233 |

(Continued)

FOREIGN PATENT DOCUMENTS

| EP | 1058459 A | 12/2000 |
| JP | 11-177947 A | 7/1999 |

OTHER PUBLICATIONS

Hugh M. Smith, Matt W. Murka, and Eric Torng. "Bandwidth Allocation for Layer Multicasted Video", IEEE Internation Conference on Multimedia COmputing and Systems, 1999, 6 pages.*

(Continued)

*Primary Examiner* — Imad Hussain
(74) *Attorney, Agent, or Firm* — Global IP Counselors, LLP (57) ABSTRACT

A transmitting apparatus includes an MPEG encoder; a baseband unit; transceiving devices for transmitting the video signal output from the baseband unit as a wireless LAN radio wave and for acquiring the incoming transmission rate that shows the receiving condition of the video signal from the receiving apparatus; and a control device. The control device controls the MPEG encoder and baseband unit so as to reduce the outgoing transmission rate of the video signal when the incoming transmission rate is smaller than a first threshold value, and reduce the resolution of the video signal when the incoming transmission rate is smaller than a second threshold value, which is smaller than the first threshold value. When the transmission condition is poor, it is possible to alleviate frame loss and breakup of vide signal to be displayed in a display apparatus.

9 Claims, 5 Drawing Sheets

(56) References Cited

U.S. PATENT DOCUMENTS

| | | | |
|---|---|---|---|
| 7,274,740 B2* | 9/2007 | van Beek et al. | 375/240.02 |
| 7,342,880 B2* | 3/2008 | Yanagihara et al. | 370/232 |
| 7,423,990 B2* | 9/2008 | Kelton et al. | 370/329 |
| 8,259,816 B2* | 9/2012 | Coleman, Sr. | 375/240.26 |
| 8,285,877 B1* | 10/2012 | Herz et al. | 709/246 |
| 2002/0004840 A1* | 1/2002 | Harumoto et al. | 709/231 |
| 2002/0059637 A1 | 5/2002 | Rakib | |
| 2002/0140851 A1* | 10/2002 | Laksono | 348/388.1 |
| 2003/0043281 A1 | 3/2003 | Nakamura | |
| 2003/0198184 A1* | 10/2003 | Huang et al. | 370/231 |
| 2005/0018772 A1* | 1/2005 | Sung et al. | 375/240.16 |
| 2006/0095942 A1* | 5/2006 | van Beek | 725/81 |
| 2006/0193380 A1* | 8/2006 | Laksono | 375/240.01 |
| 2007/0053428 A1* | 3/2007 | Saleem et al. | 375/240 |
| 2007/0274381 A1* | 11/2007 | Li et al. | 375/240.01 |
| 2009/0083431 A1* | 3/2009 | Balachandran et al. | 709/228 |
| 2010/0054270 A1* | 3/2010 | Shinozaki | 370/413 |
| 2010/0189183 A1* | 7/2010 | Gu et al. | 375/240.28 |
| 2011/0202674 A1* | 8/2011 | Su et al. | 709/231 |
| 2012/0271920 A1* | 10/2012 | Isaksson | 709/219 |
| 2013/0044807 A1* | 2/2013 | Lamy-Bergot et al. | 375/240.03 |
| 2013/0051768 A1* | 2/2013 | Soroushian et al. | 386/248 |
| 2013/0101015 A1* | 4/2013 | He et al. | 375/240.02 |
| 2013/0208080 A1* | 8/2013 | Lukasik et al. | 348/14.09 |

OTHER PUBLICATIONS

"Loops", Advanced Bash-Scripting Guide, retreived by archive.org on Jun. 14, 2002 from http://www.tldp.org/LDP/abs/html/loops1.html, 10 pages.*

* cited by examiner

TRANSMITTING APPARATUS FOR TRANSMITTING DATA AND TRANSCEIVING SYSTEM FOR TRANSMITTING AND RECEIVING DATA

BACKGROUND OF THE INVENTION

1. Field of the Invention

The present invention generally relates to a transmitting apparatus. More specifically, the present invention relates to a transmitting apparatus for transmitting a video signal to a receiving apparatus for displaying pictures.

2. Background Information

There has been known a picture image communication apparatus that transmits video signals by way of a transmission channel, as shown in Japanese Laid-Open Patent Application No. 11-177947. This picture image communication apparatus is provided with an imaging apparatus as a transmitting apparatus, and a recording display as a receiving apparatus. The imaging apparatus compresses the captured image data for each field to generate compressed picture data, assigns a field number to each field of compressed picture data, and transmits the compressed picture data and field numbers. The receiving apparatus receives and stores the compressed picture data and the field numbers, determines the reception condition based on the field numbers received. If a poor reception state continues for a certain length of time, the receiving apparatus starts reading solely the even- or odd-numbered fields. When an adequate reception condition continues for a certain length of time, the receiving apparatus carries out the read operation for each frame. Degradation of the display picture, which tends to occur when the compressed picture data is transmitted and displayed through a transmission channel with a poor transmission condition, can thereby be alleviated.

In Japanese Laid-Open Patent Application No. 11-177947, degradation of the display picture is alleviated by the recording display (the receiving side apparatus) displaying a picture by using only the even-numbered fields or odd-numbered fields when the reception condition is poor. In this arrangement, however, the imaging apparatus (the transmitting side apparatus) does not control the data transmission based on the reception condition of the transmission channel. For this reason, a large amount of data is lost or dropped at irregular intervals from the compressed image data received by the receiving apparatus when the transmission bandwidth between the transmitting and receiving apparatuses has narrowed due to the effect of the installation distance between the transmitting and receiving apparatuses, the shielding between the transmitting and receiving apparatuses, the radio waves from other wireless equipment, or other factors on the transmission bandwidth. Even when the receiving apparatus displays image using only the even- or odd-numbered fields, the displayed images tend to lose frames or experience breakup.

In view of the above, it will be apparent to those skilled in the art from this disclosure that there exists a need for an improved transmitting apparatus that overcomes the problems of the conventional art. This invention addresses this need in the art as well as other needs, which will become apparent to those skilled in the art from this disclosure.

SUMMARY OF THE INVENTION

The present invention provides a transmitting apparatus for transmitting image data signals to a receiving apparatus, the transmitting apparatus being capable of alleviating frame loss and breakup in images displayed by the receiving apparatus even when the transmission condition of the transmission channel is poor.

The transmitting apparatus according to the first aspect of the present invention is a transmitting apparatus adapted to obtain from a recording medium data to be played, transmit the data to be played to a receiving apparatus, and to receive an incoming transmission data from the receiving apparatus. The transmitting apparatus includes a compressor, a baseband unit, a transmitter, a receiver, and a controller. The compressor is configured to compress the data to be played such that the compressed data has a preconfigured resolution. The baseband unit is configured to output at a preconfigured outgoing transmission rate the data to be played. The transmitter is configured to transmit the data to be played. The receiver is configured to receive the incoming transmission rate from the receiving apparatus. The controller is operatively coupled to the compressor, the baseband unit, the transmitter, and the receiver, and is configured to adjust at least one of the resolution and the outgoing transmission rate based on the incoming transmission rate of the receiving apparatus.

With this transmitting apparatus, the transmission rate (the number of frames or fields transmitted per unit of time) and the resolution are controlled in accordance with the reception condition at the receiving apparatus, so frame or field loss in the video signal received in the receiving apparatus can be alleviated. Therefore, the video signal is received and displayed with substantially no frame or field loss, and frame loss and breakup in the displayed video can be prevented even when the reception condition of the receiving apparatus has worsened because of the poor transmission condition of the transmission channel between the transmitting and receiving apparatuses.

The transmitting apparatus according to the second aspect of the present invention, is the transmitting apparatus according to the first aspect of the present invention, in which the controller is configured to reduce one of the resolution and the outgoing transmission rate when the incoming transmission rate falls below a first threshold value.

With this transmitting apparatus, when the reception state worsens, frame loss or other degradation is prevented by reducing either the outgoing transmission rate or the resolution.

The transmitting apparatus according to the third aspect of the present invention is the transmitting apparatus according to the second aspect of the present invention, in which the controller is configured to further reduce the other of the resolution and the outgoing transmission rate when the incoming transmission rate falls below a second threshold value, the second threshold value being smaller than the first threshold value.

With this transmitting apparatus, when the reception state worsens, frame loss or other degradation is prevented by initially reducing one of the resolution and the outgoing transmission rate; and when the reception state further worsens, by further reducing the other of the resolution and the outgoing transmission rate. In this case, frame loss or other degradation can be further prevented without reducing too much of one of the outgoing transmission rate and the resolution.

The transmitting apparatus according to the fourth aspect of the present invention is the transmitting apparatus according to the second aspect of the present invention, in which the receiver is further configured to receive a selected priority mode from the receiving apparatus, the selected priority mode being either a transmission rate priority mode or a resolution priority mode. When the incoming transmission rate falls below the first threshold value, the controller is configured to reduce the outgoing transmission rate if the selected priority mode is the resolution priority mode, and reduce the resolution if the selected priority mode is the transmission rate priority mode.

further has a transmission mode receiving device for receiving the selection of a transmission rate priority mode or a resolution priority mode. Also, the transmission control device carries out control for reducing the outgoing transmission rate when the reception state signal falls below a first threshold value, and reducing the resolution when the reception state signal additionally falls below a second threshold value in cases in which the resolution priority mode has been selected. Conversely, the transmission control device carries out control for reducing the resolution when the reception state signal falls below a first threshold value, and reducing the outgoing transmission rate when the reception state signal additionally falls below a second threshold value in cases in which the transmission rate priority mode has been selected.

With this transmitting apparatus, frame loss or other degradation can be prevented without reducing the resolution or the outgoing transmission rate to the extent possible on the basis of the selected mode. The priority mode can be preselected by default, or if the configuration is such that the user can select the priority mode through the receiving apparatus, a transmission routine can be carried out in the priority mode selected by the user.

The transceiving system according to the fifth aspect of the present invention includes a transmitting apparatus that is adapted to obtain the data to be played and is configured to transmit the data to be played, and a receiving apparatus that is configured to receive the data to be played from the transmitting apparatus. The transmitting apparatus includes a transmitting side compressor that is configured to compress the data to be played such that the compressed data has a preconfigured resolution, a transmitting side baseband unit that is configured to output the data to be played at a preconfigured outgoing transmission rate, a transmitting side transceiver that is configured to transmit the data to be played, and a transmitting side controller that is operatively coupled to the transmitting side compressor, the transmitting side baseband unit, and the transmitting side transceiver. The receiving apparatus includes a receiving side transceiver that is configured to receive the data to be played from the transmitting apparatus and transmit an incoming transmission rate to the transmitting apparatus; and a receiving side controller that is operatively coupled to the receiving side transceiver and is configured to calculate the incoming transmission rate. The transmitting side transceiver is configured to receive the incoming transmission rate from the receiving apparatus. The transmitting side controller is configured to adjust at least one of the resolution and the outgoing transmission rate based on the incoming transmission rate.

With this transceiving system, the outgoing transmission rate (the number of frames or fields transmitted per unit of time) and the resolution are controlled in accordance with the reception condition of the receiving apparatus, so frame or field loss in the video signal received in the receiving apparatus can be prevented. Therefore, the video signal can be received and displayed with substantially no frame or field loss, and frame loss and breakup in the display picture can be alleviated even when the receiving condition of the receiving apparatus has worsened because of the poor transmission condition of the transmission channel between the transmitting and receiving apparatuses.

The transceiving system according to the sixth aspect of the present invention is the transceiving system according to the fifth aspect of the present invention, in which the receiving apparatus further includes a player that is operatively coupled to the receiving side controller and is configured to play the data to be played received from the transmitting apparatus.

The transceiving system according to the seventh aspect of the present invention is the transceiving system according to the fifth aspect of the present invention, in which the data to be played includes video data.

The transmitting apparatus according to the eighth aspect of the present invention is adapted to obtain video data from a recording medium, transmit the video data to a display apparatus, and to receive an incoming transmission rate data from the display apparatus. The transmitting apparatus includes compressing means for compressing the video data such that the compressed data has a preconfigured resolution, encoding means for encoding the compressed video data so as to be transmitted over a wireless network at a preconfigured outgoing transmission rate, transmitting means for transmitting the encoded and compressed video signal as a wireless network radio wave, receiving means for receiving the incoming transmission rate from the display apparatus, and control means for controlling the compressing means and the encoding means so as to reduce the outgoing transmission rate when the incoming transmission rate is smaller than a first threshold value, and to further reduce the resolution of the video data when the incoming transmission rate is smaller than a second threshold value, the second threshold value being smaller than the first threshold value.

The transmitting apparatus according to the ninth aspect of the present invention is the transmitting apparatus according to the eight aspect of the present invention, in which the compressing means compresses the video data in MPEG format, and the encoding means encodes the compressed video data so as to be transmitted over a wireless LAN.

The compressing means compresses the video signal in the MPEG format. The encoding means encodes the video data that has been compressed in the MPEG format in conformance with wireless LAN specifications. The transmitting means transmits the video signal output from the encoding means as a wireless LAN radio wave.

In this transmitting apparatus, the outgoing transmission rate (the number of frames or fields transmitted per unit of time) and the resolution are controlled in accordance with the incoming transmission rate, so frame or field loss in the video signal received in the receiving apparatus can be alleviated. Therefore, the video signal is received and displayed without frame loss, and frame loss and breakup in the display picture can be prevented even when the reception condition at the receiving apparatus has worsened because of the poor condition of the transmission channel between the transmitting and receiving apparatuses.

When the incoming transmission rate is reduced, frame loss or other degradation is prevented by initially reducing the transmission rate without reducing the resolution; and when the incoming transmission rate is further lowered, frame loss or other degradation is prevented by reducing the resolution in addition to the transmission rate. Frame loss or other degradation can thereby be alleviated without reducing the resolution to as much as possible.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Configuration

Figure 1:
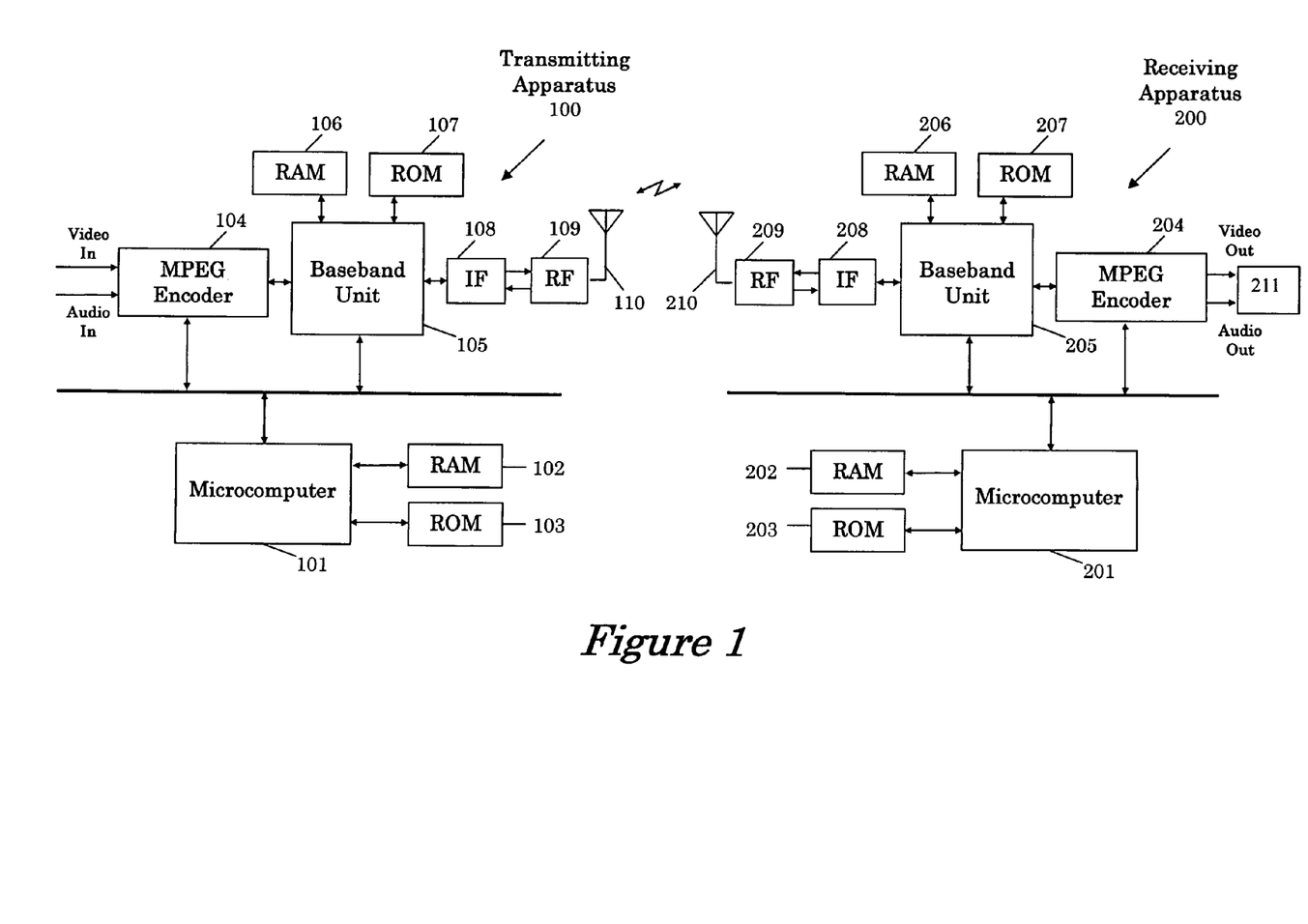
FIG. 1 is a schematic structural diagram of the transceiving system according to an embodiment of the present invention.

Referring initially to FIG. 1, a transmitting apparatus and a transceiving system are illustrated in accordance with a first embodiment of the present invention. FIG. 1 is a functional block diagram of a transceiving system according to an embodiment of the present invention. The transceiving system has a transmitting apparatus 100 and a receiving apparatus 200.

Transmitting Apparatus 100

The transmitting apparatus 100 is an optical disk apparatus or a videotape apparatus that reads audio and video signals from a DVD or other optical disk, or from videotape or other recording medium, and transmits audio and/or video signals as wireless LAN radio waves. The transmitting apparatus 100 may have a recording function, or may have solely a playing function without a recording function.

The transmitting apparatus 100 in this embodiment is principally provided with a microcomputer 101, an MPEG encoder 104 (an example of the transmitting side compressor and compressing means), a baseband unit 105 (an example of the encoding means), an IF unit 108, an RF unit 109, and an antenna 110 (examples of the transmitter, the receiver, the transmitting side transceiver, transmitting means, and receiving means). The microcomputer 101 (an example of the transmitting side controller and the control means) is operatively connected to the MPEG encoder 104 and the baseband unit 105 in a conventional manner so as to be able to selectively control the operation of the MPEG encoder 104 and the baseband unit 105.

The MPEG encoder 104 encodes (compresses), using the MPEG format, the audio and video signals that are read from the recording medium. The compression rate of the MPEG encoder 104 is adjustable, and is controlled by the microcomputer 101. More specifically, the spatial resolution per frame or field is adjusted by changing the compression rate of the MPEG encoder 104. Although the MPEG encoder 104 is used in this embodiment, any other codec can be utilized as long as its compression rate is adjustable.

The baseband unit 105 is a circuit that encodes and decodes signals in conformance with wireless LAN specifications. The baseband unit 105 encodes the audio and video signals output from the MPEG encoder 104 to generate a baseband signal, and decodes the baseband signal output from the IF unit 108. The RAM 106 is a memory that is used as a work area for the encoding and decoding routines performed by the baseband unit 105. The ROM 107 is a memory in which various parameters used in the routines performed by the baseband unit 105 are stored. The baseband unit 105 can vary the number of frames or fields (outgoing transmission rate) of the audio/video data that are transmitted per a unit of time, and the baseband unit 105 is controlled by the microcomputer 101.

The IF unit 108 converts the baseband signal generated by the baseband unit 105 into an intermediate frequency (IF) signal, outputs the IF signal to an RF (radio frequency) unit 109. Conversely, the IF unit 108 converts the IF signal output from the RF unit 109 into a baseband signal. The RF unit 109 converts the IF signal output from the IF unit 108 into an RF signal in a wireless waveband, outputs the RF signal to the antenna 110. Conversely, the RF unit 109 converts the RF signal output from the antenna 110 into an IF signal, and outputs the IF signal to the IF unit 108. The antenna 110 converts the audio and video signals into a wireless LAN radio wave and transmits the radio wave.

The microcomputer 101 reads the audio and video signals from the recording medium, and controls the entire transmitting apparatus 100 including control of the compression ratio of the MPEG encoder 104 and control of the outgoing transmission rate in the baseband unit 105. Also, the microcomputer 101 obtains the incoming transmission rate S described below through the antenna 110, the RF unit 109, the IF unit 108 and the baseband unit 105. The microcomputer 101 also calculates the maximum outgoing transmission rate and the resolution in accordance with the incoming transmission rate S such that the outgoing transmission rate is maximized without exceeding the current transmission bandwidth. The microcomputer 101 then controls the MPEG encoder 104 and the baseband unit 105 so as to achieve the calculated outgoing transmission rate and resolution. The RAM 102 is a memory that is used as a work area for routines carried out by the microcomputer 101, and the ROM 107 is a memory in which programs and various parameters used in the routines carried out by the microcomputer 101 are stored.

The receiving apparatus 200 is preferably an LCD, PDP, or other display apparatus. The receiving apparatus 200 displays audio and video signals received from the transmitting apparatus 100 on the display unit (not shown).

Receiving Apparatus 200

The receiving apparatus 200 is principally provided with a microcomputer 201 (an example of the receiving side controller), an MPEG encoder 204, a baseband unit 205, an IF unit 208, an RF unit 209, and an antenna 210 (examples of the receiving side transceiver). The microcomputer 201 is operatively connected in a conventional manner to the baseband unit 205 and the MPEG encoder 204 so as to be able to selectively control the baseband unit 205 and the MPEG encoder 204. Although the receiving apparatus 200 further includes an output device 211 in this embodiment, the receiving apparatus of the present invention can be constituted without an output device and instead be coupled to an external output apparatus.

The antenna 210 receives the wireless LAN radio waves containing audio and video signals. The RF unit 209 converts the RF signal output from the antenna 210 into an IF signal, and outputs the IF signal to the IF unit 208. Conversely, the RF unit 209 converts the IF signal output from the IF unit 208 into an RF signal in a wireless waveband, and outputs the RF signal to the antenna 210.

The IF unit 208 converts the IF signal output from the RF unit 209 into a baseband signal, and outputs the baseband signal to the baseband unit 205. Conversely, the IF unit 208 converts the baseband signal generated by the baseband unit 205 into an IF signal, and outputs the baseband signal to the RF unit 209. The baseband unit 205 is a circuit that decodes the baseband signal output from the IF unit 208, and encodes and decodes signals in conformance with wireless LAN specifications. The RAM 206 is a memory that is used as a work area for the encoding and decoding routines performed by the baseband unit 205. The ROM 207 is a memory in which programs and various parameters used by the encoding and decoding routines carried out by the baseband unit 205 are stored. The MPEG encoder 204 decodes the signal encoded in the baseband unit 205 and outputs the audio and video signals, and these audio and video signals are output from the output device 211 having a display unit and a speaker.

The microcomputer 201 controls the entire transmitting apparatus 200, including control of the MPEG decoder 204 and control of the baseband unit 205. Also, the microcomputer 201 calculates the incoming transmission rate S on the receiving side, which is the incoming transmission rate of the audio and video signals received by the antenna 210. The incoming transmission rate S is then transmitted to the transmitting apparatus 100 as a wireless LAN radio wave every predetermined period of time through the baseband unit 205, the IF unit 208, and the RF unit 209. The RAM 202 is a memory that is used as a work area for routines carried out by the microcomputer 201, and the ROM 207 is a memory in which programs and various parameters used in the routines carried out by the microcomputer 201 are stored.

Operation

Figure 2:
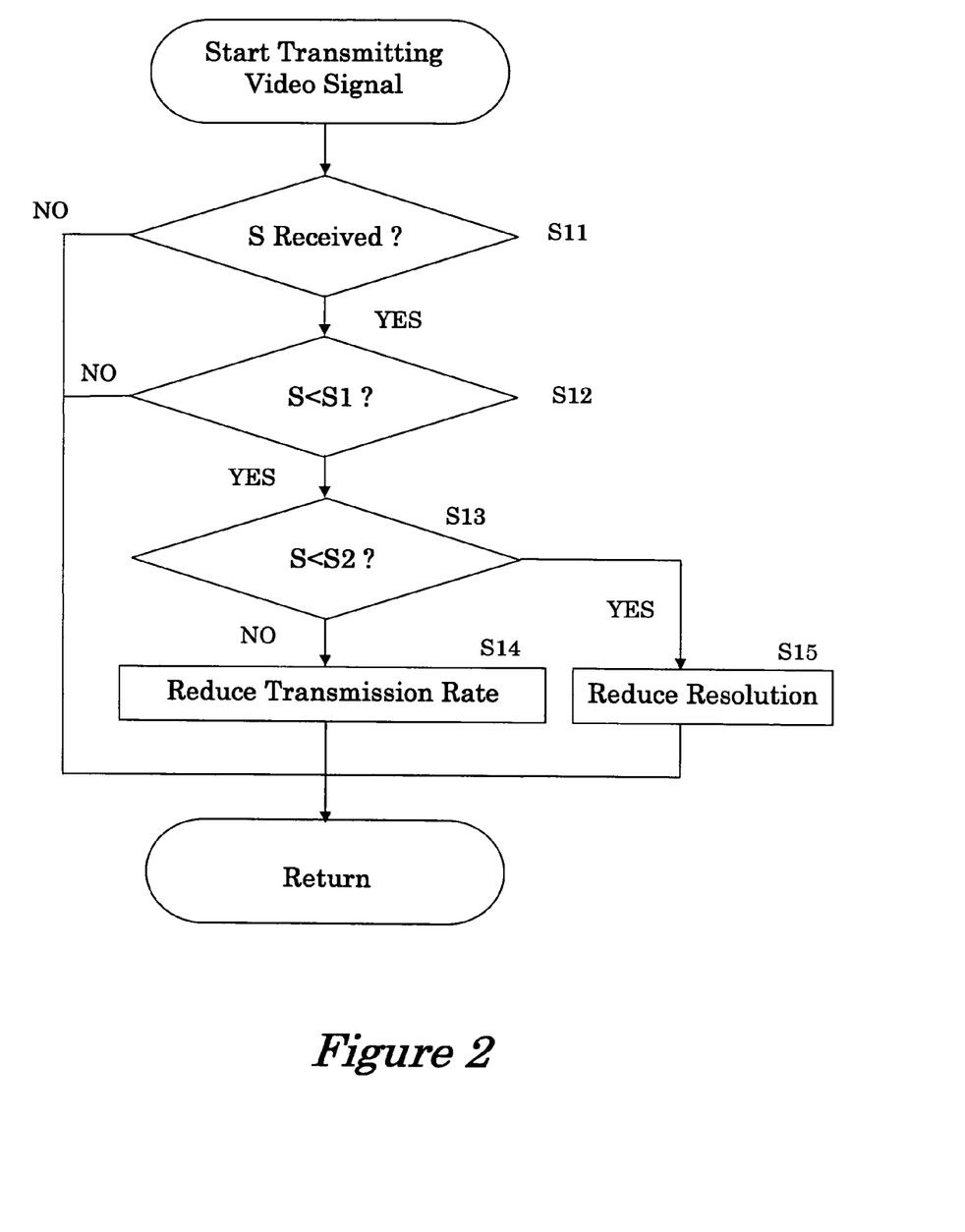
FIG. 2 is a flowchart showing the transmission routine according to the first embodiment of the present invention.

The transmission of audio and video signals from the transmitting apparatus 100 to the receiving apparatus 200 is described below with reference to FIG. 2.

In step S11, a determination is made as to whether the incoming transmission rate S from the receiving apparatus 200 has been received. The system returns to the beginning if the incoming transmission rate S has not been received, and advances to step S12 if the incoming transmission rate S has been received. In step S12, a determination is made as to whether the incoming transmission rate S is smaller than a first threshold value S1. The system returns to the beginning if the incoming transmission rate S is equal to or greater than S1, and advances to step S13 if S is smaller than the first threshold value S1.

In step S13, a determination is made as to whether the incoming transmission rate S is smaller than a second threshold value S2. This second threshold value S2 is smaller than the first threshold value S1. When the transmission condition of the wireless LAN radio waves is poor and the incoming transmission rate S has fallen below the first threshold value S1 but not below the second threshold value S2, the system advances from step S13 to step S14, and the baseband unit 105 is directed to reduce the outgoing transmission rate. Here, the outgoing transmission rate is reduced to a maximum value that does not exceed the current transmission bandwidth. The lower the incoming transmission rate S is, the narrower the current transmission bandwidth is. Therefore, the lower the incoming transmission rate is, the more the outgoing transmission rate is reduced, such that the outgoing transmission rate is lowered.

When the transmission condition of the wireless LAN radio waves further worsens and the incoming transmission rate S falls below the second threshold value S2, the system advances from step S13 to step S15, where the compression ratio of the MPEG encoder 104 is increased, and the spatial resolution per frame or filed of the video signal to be transmitted is reduced. Here, the resolution is reduced to a maximum value that does not exceed the current transmission bandwidth. The lower the incoming transmission rate is, the narrower the current transmission bandwidth is. Therefore, the lower the incoming transmission rate is, the more the resolution is reduced, and the resolution is lowered.

With the transmitting apparatus according to the present embodiment, even if the state of the wireless radio waves between the transmitting apparatus 100 and the receiving apparatus 200 worsens and the transmission bandwidth has narrowed due to the installation distance between the transmitting apparatus 100 and the receiving apparatus 200, the shielding between the transmitting apparatus 100 and the receiving apparatus 200, and the radio waves from other wireless equipment, the audio and video signals can be received with substantially no frame or field loss in the receiving apparatus 200. Also, frame loss and breakup in the picture displayed on the receiving apparatus 200 can be prevented because the outgoing transmission rate and resolution are controlled, within a range in which the transmission bandwidth is not exceeded, in accordance with incoming transmission rate S received from the receiving apparatus 200.

When the transmission bandwidth has narrowed, the outgoing transmission rate is initially reduced, and when it is not sufficient to merely reduce the outgoing transmission rate, the resolution is also reduced. In this manner, frame loss and breakup of the displayed image can be alleviated at the receiving apparatus 200, with a minimal amount of degradation in the resolution.

Second Embodiment

Figure 3:
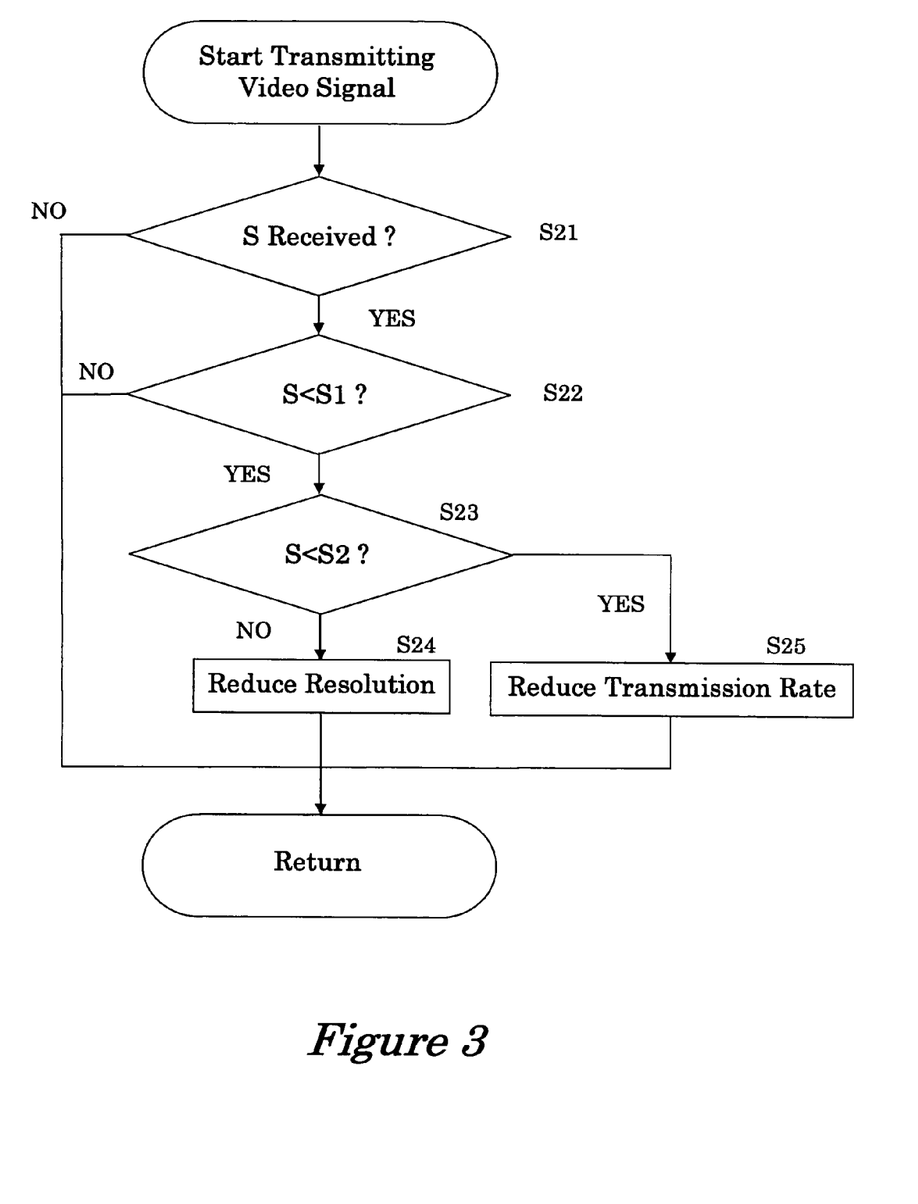
FIG. 3 is a flowchart showing the transmission routine according to the second embodiment of the present invention.

Referring now to FIG. 3, a transceiving system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The transceiving system according to the second embodiment initially reduces the resolution when the incoming transmission rate has decreased. When it is not sufficient to merely reduce the resolution, the outgoing transmission rate is reduced as well. In terms of the configuration, the transceiving system according to the second embodiment of the present invention is configured in the same manner as in the first embodiment.

Shown in FIG. 3 is the transmission routine according to the second embodiment. Steps S21 and S22 are basically the same as step S11 and step S12 of the above-described first embodiment. More specifically, In step S21, a determination is made as to whether the incoming transmission rate S from the receiving apparatus 200 has been received. The system returns to the beginning if the incoming transmission rate S has not been received, and advances to step S22 if the incoming transmission rate S has been received. In step S22, a determination is made as to whether the incoming transmission rate S is smaller than a first threshold value S1. The system returns to the beginning if the incoming transmission rate S is equal to or greater than S1, and advances to step S23 if S is smaller than the first threshold value S1.

In step S23, a determination is made as to whether the incoming transmission rate S is smaller than a second threshold value S2. This second threshold value S2 is smaller than the first threshold value S1. In the present embodiment, when the incoming transmission rate S is smaller than S1, the system advances from step S23 to step S24, where the compression ratio of the MPEG encoder 104 is increased, and the spatial resolution per frame or field of the video signal to be transmitted is also reduced. Here, the resolution is reduced to a maximum value that does not exceed the current transmission bandwidth. The lower the incoming transmission rate is, the narrower the current transmission bandwidth is. Therefore, the lower the incoming transmission rate S is, the more the resolution is reduced, and the resolution is lowered.

When the incoming transmission rate S is smaller than S2 in step S23, the system advances from step S23 to step S25, and the baseband unit 105 is directed to reduce the outgoing transmission rate. Here, the outgoing transmission rate is reduced to a maximum value that does not exceed the current transmission bandwidth. The lower the incoming transmission rate is, the narrower the current transmission bandwidth is. Therefore, the lower the incoming transmission rate is, the more the outgoing transmission rate is reduced, and the outgoing transmission rate is lowered.

In accordance with the present embodiment, when the transmission bandwidth has narrowed, the resolution is reduced initially, and when it is not sufficient to merely reduce the resolution, the outgoing transmission rate is also reduced. In this manner, frame loss and breakup of the displayed image are alleviated in the receiving apparatus 200 with a minimal amount of reduction in the outgoing transmission rate.

Third Embodiment

Figure 4:
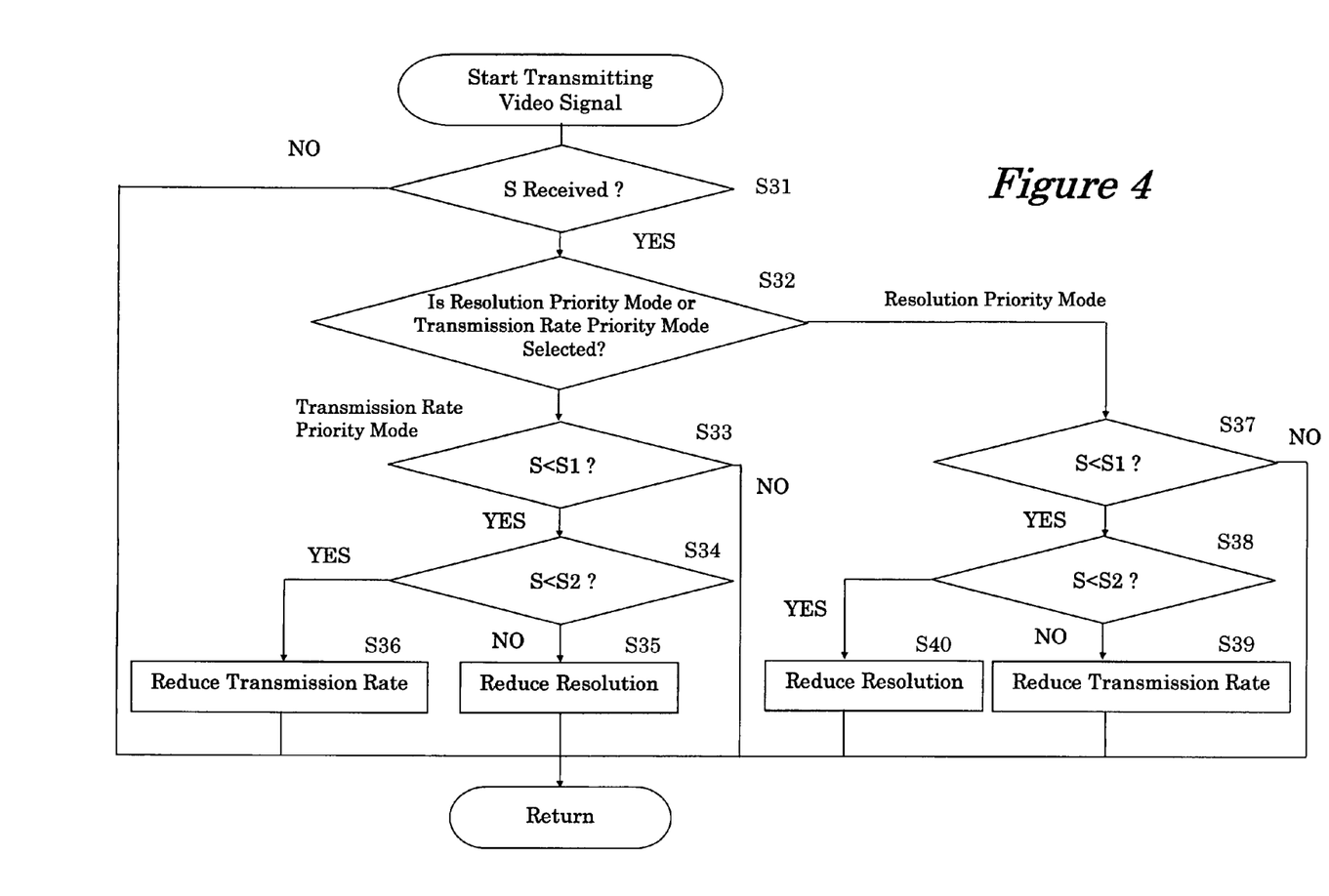
FIG. 4 is a flowchart showing the transmission routine according to the third embodiment of the present invention.

Referring now to FIG. 4 a transceiving system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the transceiving system according to the third embodiment, the transmitting apparatus receives a selection of transmission rate priority mode or resolution priority mode. The transmitting apparatus controls the outgoing transmission rate and resolution in accordance with the selected mode. In other words, when the resolution priority mode is selected, the outgoing transmission rate is initially reduced if the transmission condition is poor, and when it is not sufficient to merely reduce the outgoing transmission rate, the resolution is also reduced. Conversely, when the transmission rate priority mode is selected, the resolution is initially reduced if the transmission condition is poor, and when it is not sufficient to merely reduce the resolution, the outgoing transmission rate is also reduced.

The user can select the priority mode by direct input of data to the transmitting apparatus 200 either with a remote controller or other input device or by direct inputting to the main body of the transmitting apparatus 200. The selected mode may be transmitted to the transmitting apparatus 100 by way of the wireless LAN radio waves. Alternatively, the user can input data to the transmitting apparatus 100 with a remote controller or by directly operating the transmitting apparatus 100. Also, the priority mode may be set to the resolution priority mode (or the transmission rate priority mode) by default, and the user may change the priority mode to the other priority mode.

Shown in FIG. 4 is the transmission routine according to the present embodiment. The processing in step S31 is basically the same as the step S11 in the above-described first embodiment. More specifically, in step S31, a determination is made as to whether the incoming transmission rate S from the receiving apparatus 200 has been received. The system returns to the beginning if the incoming transmission rate S has not been received, and advances to step S32 if the incoming transmission rate S has been received.

In step S32, a determination is made as to whether the transmission mode selected by the user is the resolution priority mode or the transmission rate priority mode. When the resolution priority mode is selected in step S32, the system advances to step S37 and carries out processing in the same manner as the first embodiment. In other words, when the incoming transmission rate S has fallen below the first threshold value S1 but still above the second threshold value S2, the system advances from step S32 to step S38 and then to step S39, and the baseband unit 105 is directed to reduce the outgoing transmission rate. When the incoming transmission rate S falls below the second threshold value S2, the system advances from step S38 to step S40, and the MPEG encoder 104 is directed to reduce the resolution as well.

When, on the other hand, the transmission rate priority mode is selected in step S32, the system advances to step S33 and carries out processing in the same manner as the second embodiment. In other words, when the incoming transmission rate S has fallen below the first threshold value S1 but still above the second threshold value S2, the system advances from step S34 to step S35, and the MPEG encoder 104 is directed to reduce the resolution. When the incoming transmission rate S falls below the second threshold value S2, the system advances from step S34 to step S36, and the baseband unit 105 is directed to reduce the outgoing transmission rate.

In accordance with the present embodiment, one of the resolution and transmission rate is given priority as needed. In this manner; frame loss and breakup of the displayed image can be alleviated with a minimal amount of degradation or reduction of the displayed image.

Combination of Transmitting and Receiving Apparatuses

Figure 5:
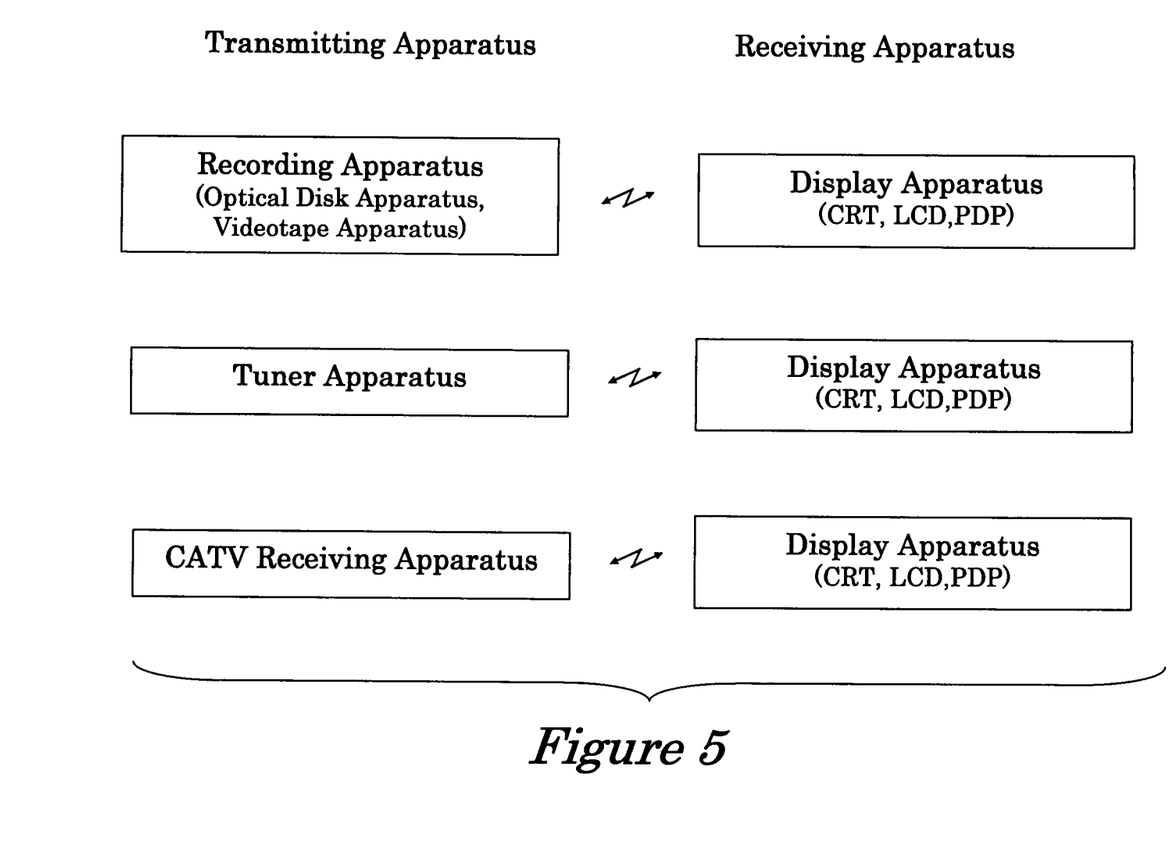
FIG. 5 is an example of combining the transmitting and receiving apparatuses according to the present invention.

FIG. 5 shows various examples of combination of the transmitting apparatus 100 and the receiving apparatus 200. The transmitting apparatus 100 can be, aside from the recording apparatuses (optical disk apparatus or videotape apparatus) described above, a tuner that receives analog or digital broadcasting signals and BS, CS, or other satellite broadcast waves, a cable television (CATV) receiver, or other devices. Also, the tuner and the cable television (CATV) receiver may have a recording apparatus.

The receiving apparatus 200 can be a display apparatus (CRT, LCD, PDP) or the like. However, a recording apparatus (optical disk apparatus or videotape apparatus) that does not have a CRT, LCD, PDP, or other display unit can also function as the receiving apparatus 200 since such receiving apparatus 200 can be operatively connected to a display apparatus such as CRT, LCD, PDP, and other display apparatus, such that the receiving apparatus 200 can receive audio and video signals and output video signals to the display apparatus.

In accordance with the transmitting apparatus of the present invention, frame loss and breakup of image data received by the receiving apparatus can be alleviated even when the condition of the transmission channel has worsened.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-430882. The entire disclosure of Japanese Patent Application No. 2003-430882nis hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A transmitting apparatus adapted to obtain from a recording medium data to be played, the transmitting apparatus comprising:
    a compressor configured to compress the data to be played such that the compressed data has a preconfigured resolution;
    a baseband unit configured to output at a preconfigured outgoing transmission rate the data to be played;
    a transmitter configured to transmit the data to be played to a receiving apparatus;
    a receiver configured to receive from the receiving apparatus an incoming transmission rate that is calculated by the receiving apparatus; and
    a controller operatively coupled to the compressor, the baseband unit, the transmitter, and the receiver, the controller being configured to perform a first reduction of only one of the resolution and the outgoing transmission rate in response to the incoming transmission rate falling below a first threshold value, the controller being further configured to further perform a second reduction of the other of the resolution and the outgoing transmission rate in addition to the first reduction of the one of the resolution and the outgoing transmission rate in response to the incoming transmission rate further falling below a second threshold value after the incoming transmission rate falling below the first threshold value and the one of the resolution and the outgoing transmission rate being reduced, the second threshold value being smaller than the first threshold value, the first reduction being different from the second reduction,
    the controller being further configured to repeat to perform the first reduction of the one of the resolution and the outgoing transmission rate while the incoming transmission rate being smaller than the first threshold value and larger than the second threshold value.

2. The transmitting apparatus according to claim 1, wherein
    the controller is configured to perform the first reduction of only the resolution response to the incoming transmission rate falling below the first threshold value, the controller being further configured to further perform the second reduction of the outgoing transmission rate in addition to the first reduction of the resolution in response to the incoming transmission rate further fatting below the second threshold value.

3. The transmitting apparatus according to claim 1, wherein
    the controller is configured to perform the first reduction of only the outgoing transmission rate in response to the incoming transmission rate falling below the first threshold value, the controller being further configured to further perform the second reduction of the resolution in addition to the first reduction of the outgoing transmission rate in response to the incoming transmission rate further falling below the second threshold value.

4. The transmitting apparatus according to claim 1, wherein
    the receiver is further configured to receive a selected priority mode from the receiving apparatus, the selected priority mode being either a transmission rate priority mode or a resolution priority mode, and
    when the incoming transmission rate falls below the first threshold value, the controller is configured to reduce the outgoing transmission rate if the selected priority mode is the resolution priority mode, and reduce the resolution if the selected priority mode is the transmission rate priority mode.

5. A transceiving system adapted to obtain from a recording medium data to be played, the transceiving system comprising:
    a transmitting apparatus adapted to obtain the data to be played, the transmitting apparatus including
        a transmitting side compressor that is configured to compress the data to be played such that the compressed data has a preconfigured resolution,
        a transmitting side baseband unit that is configured to output the data to be played at a preconfigured outgoing transmission rate,
        a transmitting side transceiver that is configured to transmit the data to be played, and
        a transmitting side controller that is operatively coupled to the transmitting side compressor, the transmitting side baseband unit, and the transmitting side transceiver; and
    a receiving apparatus including
        a receiving side transceiver that is configured to receive the data to be played from the transmitting apparatus and transmit an incoming transmission rate to the transmitting apparatus, and
        a receiving side controller that is operatively coupled to the receiving side transceiver, the receiving side controller being configured to calculate the incoming transmission rate,
    the transmitting side transceiver being configured to receive the incoming transmission rate from the receiving apparatus,
    the transmitting side controller being configured to perform a first reduction of only one of the resolution and the outgoing transmission rate in response to the incoming transmission rate falling below a first threshold value, the transmitting side controller being further configured to further perform a second reduction of the other of the resolution and the outgoing transmission rate in addition to the first reduction of the one of the resolution and the outgoing transmission rate in response to the incoming transmission rate further falling below a second threshold value after the incoming transmission rate falling below the first threshold value and the one of the resolution and the outgoing transmission rate being reduced, the second threshold value being smaller than the first threshold value, the first reduction being different from the second reduction, the transmitting side controller being further configured to repeat to perform the first reduction of the one of the resolution and the outgoing transmission rate while the incoming transmission rate being smaller than the first threshold value and larger than the second threshold value.

6. The transceiving system according to claim 5, wherein the receiving apparatus further includes a player that is operatively coupled to the receiving side controller and is configured to play the data to be played received from the transmitting apparatus.

7. The transceiving system according to claim 5, wherein the data to be played includes video data.

8. A transmitting apparatus adapted to obtain video data from a recording medium, the transmitting apparatus comprising:

compressing means for compressing the video data such that the compressed data has a preconfigured resolution;

encoding means for encoding the compressed video data so as to be transmitted over a wireless network at a preconfigured outgoing transmission rate;

transmitting means for transmitting the encoded and compressed video data to a display apparatus as a wireless network radio wave;

receiving means for receiving from the display apparatus an incoming transmission rate that is calculated by the display apparatus; and control means for controlling the compressing means and the encoding means so as to perform a first reduction of only the outgoing transmission rate in response to the incoming transmission rate falling below a first threshold value, and to further perform a second reduction of the resolution of the video data in addition to the first reduction of the outgoing transmission rate in response to the incoming transmission rate falling below a second threshold value after the incoming transmission rate falling below the first threshold value and the outgoing transmission rate being reduced, the second threshold value being smaller than the first threshold value, the first reduction being different from the second reduction, the control means further performing a function for repeating to perform the first reduction of the outgoing transmission rate white the incoming transmission rate being smaller than the first threshold value and larger than the second threshold value.

9. The transmitting apparatus according to claim 8, wherein the compressing means compresses the video data in MPEG format, and the encoding means encodes the compressed video data so as to be transmitted over a wireless LAN.

* * * * *